(No Model.)
O. C. CRANE.
PORTABLE HAND DRILL.
No. 544,402. Patented Aug. 13, 1895.
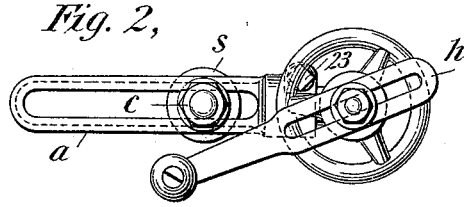
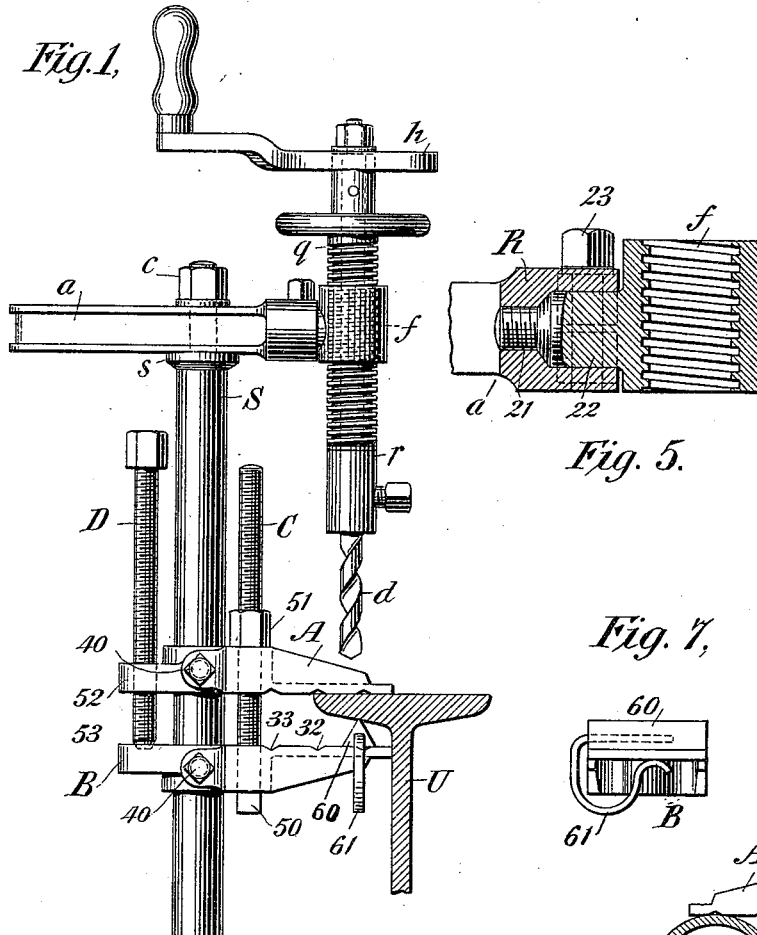
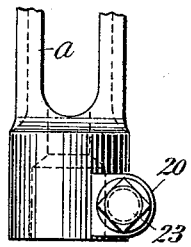
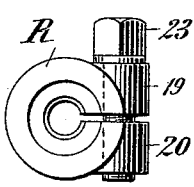
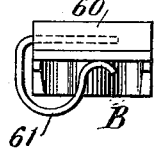
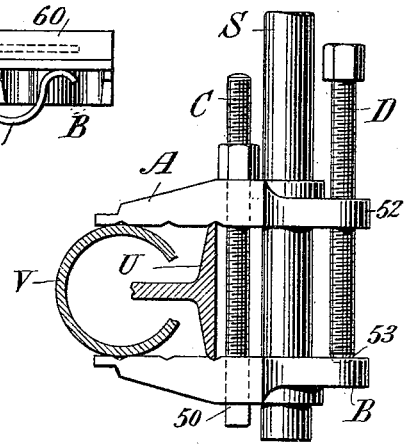
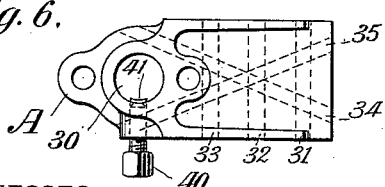
WITNESSES:
C. E. Ashley
H. W. Lloyd
INVENTOR:
Origen C. Crane
By his Attorney

UNITED STATES PATENT OFFICE.

ORIGEN C. CRANE, OF NEW YORK, N. Y.

PORTABLE HAND-DRILL.

SPECIFICATION forming part of Letters Patent No. 544,402, dated August 13, 1895.

Application filed May 7, 1895. Serial No. 548,365. (No model.)

*To all whom it may concern:*

Be it known that I, ORIGEN C. CRANE, a citizen of the United States, and a resident of New York, in the county and State of New York, have made certain new and useful Improvements in Portable Hand-Drills, of which the following is a specification.

My invention is an improvement in portable drilling-machines, such as are employed in constructing and repairing under circumstances presenting difficulties in getting access to the work.

The object of my invention is to supply a portable drill to do the work commonly required of the ordinary breast-drill or bit-stock drill, while it will require less exertion on the part of the operator by reason of the fact that it is capable of attachment to the work to be drilled, whether of regular or irregular shape, while it also possesses the capacity of drilling at any angle or in any position that can be operated upon by a mechanic. With this end in view I have provided a novel means of clamping or fixing the drill to the work and of securing accurate adjustment with respect to the exact point to be drilled.

My invention embodies a main stem or standard, preferably a section of steel tubing, which is provided with a shoulder or bearing at one end for the drill-supporting arm. I provide two parallel plates or surfaces, which are perforated to receive the round standard loosely and to easily slide thereon. Set-screws in threaded perforations in the wall of the hole or opening through which the standard passes provide for adjusting the vertical position of the standard and for using drills of varying lengths. Upon opposite sides of the standard are two screws, one of which is fixed to the lower plate and connected to the upper plate by means of a nut located above the plate. This screw is located upon one side of the standard and between it and the work to which the drill is to be attached. Its function is to draw the plates toward each other until they clamp the work. Upon the opposite side of the standard is a second screw, passing through a screw-threaded hole in the upper plate and abutting against the lower plate.
The function of this second screw is to slightly separate the ends of the plates, so that they both turn upon the first-named screw as a fulcrum. I form the surfaces of the plates with two or more transverse grooves and one or more diagonal grooves. I also provide an adjustable angular contact, which can be held in position at any point upon either the upper or the lower clamping-surfaces. The object of thus providing a grooved and angular contact-surface is to enable me to securely unite the clamping-surfaces to irregular, tapering, or circular forms, as well as to the various forms of merchant iron, such as are employed in bridge building and architectural work.

To provide for fixing the drill at any angle and at any radial distance from the standard I employ a slotted arm located on a bearing at the upper end of the standard. The drill is in a screw-threaded feed-sleeve and the feed-sleeve is located in a feed-nut, upon the side of which is a threaded projection for the purpose of connecting the said nut with the slotted arm referred to. A divided ring forms the terminal of the slotted arm, and there is a screw-threaded aperture in or adjacent to said ring. The projection upon the feed-nut enters this threaded aperture in the end of the slotted arm. The threads of this screw are comparatively fine, and when the drill has been fixed to its work, as heretofore described, the feed-nut and the drill carried thereby may be turned to any angle with respect to the standard of the drill, and the exact point at which it is desired that the drill shall operate can be reached by securing an approximate adjustment of the slotted arm, while the angle at which the drill shall enter and the exact point of contact for the drill-point may be finely or accurately adjusted and determined by rotating the drill in the plane of its major axis one or more times. I place a set-screw in the divided terminals of the ring, and when the drill has been placed in the proper position the set-screw is tightened and the drill is held to its work at a fixed angle and at a fixed point more accurately than can be done by hand-drills as heretofore constructed. By this means a series of parallel holes at a certain fixed angle may be produced. This has hitherto been impossible of accomplishment by the use of hand-drills.

The accompanying drawings illustrate my invention.

Figure 1 is a side elevation of the complete machine attached to the flange of an I-beam. Fig. 2 is a top view of the slotted arm and standard. Figs. 3, 4, and 5 are detail views of the divided ring at the end of the slotted arm. Fig. 6 is a plan view of the surface of one of the clamping-plates. Fig. 7 is a view of the adjustable contact-point of the clamping-plate, and Fig. 8 is a view illustrating the application of the clamping-surfaces to different forms of work.

In Fig. 1, S is a standard in the form of a rod or tube. There is a shoulder or bearing $s$ at its upper end. $a$ is a slotted arm located upon said bearing.

$d$ is a drill located in the drill-rod $r$, to the opposite end of which is attached a slotted handle $h$.

$q$ is a sleeve on the rod $r$, and the feed-nut $f$ supports the sleeve and drill in position.

R is a divided ring having ears 19 and 20. A screw-threaded aperture 21 is located adjacent to ring $r$ in the end of the arm $a$, and a screw-threaded projection 22 fixed to the feed-nut $f$ engages with the screw-thread of the aperture 21. This screw 21 22 is comparatively fine—say thirty or forty turns to the inch. In the ears 19 20 is a set-screw 23, by operating which the divided ring may be caused to clamp the projection 22 on the feed-nut $f$.

Upon the standard S are two plates A and B. Each is perforated with a hole 30, somewhat larger than the diameter of the rod S. As shown in Fig. 6, there are transverse grooves in the surface of each plate, such as 31 32 32, and there are one or more diagonal grooves in each plate, such as 34 and 35. Each plate is provided with a set-screw 40 and a gib or small section of metal 41, located between the end of the set-screw 40 and the standard S, so that when the set-screw 40 is tightened to hold the plate A in position the end of the screw will not injure the surface of the standard.

C and D are two screws, respectively located upon opposite sides of the standard. C is fixed at 50 to the plate B and passes through an aperture in the plate A. A nut 51 engages with the plate and screw C. Screw D, upon the opposite side of the standard, enters a screw-threaded hole 52 in plate A, and abuts at 53 upon plate B. 60 is a three-cornered piece of metal provided with a strap-spring 61, which latter holds the metal-contact 60 in position upon either plate A or B and permits of sliding the contact-point 60 out of engagement when its use is not rendered necessary by the formation of the surface to which the machine is to be fixed.

In the operation of the drilling-machine the plate A is set in position upon the standard S at the proper distance from the elevated point or end of the drill $d$ by the use of the set-screw 40 and plate B, being free to move upon the standard S. The plate A is now rested upon the work to be operated upon, such as the I-beam U, the contact-point 60 is slid into position upon the plate B, and the nut 51 is operated until the plates A and B both make contact with the beam U. The screw D is then operated to separate the ends of the plates A and B, which plates turn upon the screw C, as a fulcrum, sufficiently to firmly engage with the beam U. The drill being thus secured to its work the arm $a$ is slid along upon its bearing $s$ to bring the drill in line with the hole to be bored and the nut $c$ is set, the feed-nut $f$ and drill $d$ being turned to any desired angle corresponding with the angle of the desired hole. If the drill is not exactly in line, one or two complete revolutions of the nut $f$ and its drill $d$ in one direction or the other will accurately center it.

In Fig. 8 I have shown the utility of the grooves in the clamping surfaces or plates, which may be caused to engage with the flanges of an I-beam U or the surface of a pipe, such as V. In connection with a beam of iron, like U, I employ the diagonal grooves, such as 34 or 35, to bring the standard of the drill and the drill itself in closer proximity to the point of engagement for the drill—that is to say, I may thus bring the standard of the drill nearer to the point operated upon.

What I claim, and desire to secure by Letters Patent, is—

1. The combination in a portable drilling machine of a main post or standard, two parallel plates to support said standard upon its work, set screws in said plates to fix said standard at any desired point to provide for drills of varying length, two parallel screws upon opposite sides of said standard, respectively, one screw being fixed to the first plate and connected with the second plate by means of a nut, the other screw being screw threaded into said second plate and abutted against said first plate, a slotted arm located on a bearing at the upper end of said standard, a set nut to fix the end of said arm at any radial distance from the standard, a feed nut engaging said arm by a screw threaded connection to vary its radial distance from the end of the arm, a feed sleeve having a threaded surface engaging a corresponding thread in the feed nut, a drill spindle and drill carried by said sleeve, means for rotating said spindle, and a set screw for fixing the feed sleeve at any desired angle with respect to the standard and the work to be operated upon, substantially as described.

2. The combination of a standard carrying an adjustable arm, a feed sleeve carried by said arm, a drill spindle and drill carried by said sleeve, two parallel plates perforated to receive said standard, set screws for supporting said standard at any desired elevation and two screws upon opposite sides of said standard, respectively, one screw being fixed to the first plate and connected with the second plate by means of a nut, the second screw being screw threaded into said second plate and abutted against said first plate whereby said plates may be caused to grip the work and support the standard, while the standard may be raised and lowered without changing the connection between the drill standard and the work, substantially as described.

3. The combination of a standard carrying an adjustable arm, a feed sleeve carried by said arm, a drill spindle and drill carried by said sleeve, two parallel plates having their adjacent or opposite surfaces traversed by grooves in diagonal and transverse lines, each groove in one plate having a corresponding and parallel groove in the other plate, a perforation in each plate to receive said standard; set screws to permit of adjusting and holding said standard at any desired height, and two independent screws located upon opposite sides of said standard, respectively, one screw being fixed to the first plate and connected with the second plate by means of a nut, the second screw being threaded into said second plate and abutted against said first plate, all so arranged that said plates may be caused to engage the flanges of an I-beam or the arc of a pipe surface without marking or injuring the surface, substantially as described.

ORIGEN C. CRANE.

Witnesses:
W. S. PLACE,
WM. B. VANSIZE.